United States Patent Office 2,743,177
Patented Apr. 24, 1956

2,743,177

NICKEL-SILICON-BORON ALLOYS

Arthur T. Cape, Los Angeles, Calif., assignor to Coast Metals, Inc., Little Ferry, N. J., a corporation of Delaware No Drawing. Application May 2, 1952,
Serial No. 285,801

5 Claims. (Cl. 75—171)

This invention relates, as indicated, to nickel-silicon-boron alloys.

A primary object of the invention is to provide a series of alloys containing nickel, silicon and boron, which have unusual adherence properties, particularly the ability to adhere to stainless steel and to pure molybdenum.

Another object of the invention is to provide an alloy of the character described which is useful in the brazing or joining of strips or plates of stainless steel and in the hard facing of molybdenum.

Another object of the invention is to provide alloys of the character described, which are particularly well adapted for hard facing at relatively low temperatures, where resistance to wear, impact, corrosion and oxidation are vital considerations or factors.

Another object of the invention is to provide alloys of the character described, which are extremely resistant to oxidation at temperatures even up to their melting points.

A further object of the invention is to provide alloys of the character described, having melting points which are so low, that they may be applied as facings to poppet valves and the like with considerably more ease than is possible when using other facing metals commonly employed for this purpose.

A further object of the invention is to provide alloys of the character described, which may be readily bonded with almost any variety of base metal, satisfactory bonds being obtained at temperatures far below those required when using conventional facing metals.

A further object of the invention is to provide an alloy having the curious property of being plastically formable over a relatively wide range of temperatures, i. e., as great as 150° to 350° F., in which state, the metal is coherent but can be shaped, smoothed or molded by the application of a small amount of pressure, that is to say, not more than a few pounds per square inch.

A still further object of the invention is to provide castings, formed from alloys of the aforesaid compositions, and having low coefficients of expansion, and which may be "sweated" to surfaces at temperatures below 2100° F.

Other objects and advantages will become apparent during the course of the following description:

The alloys coming within the scope of this invention contain silicon, in amounts of from about 2.5% to about 5.5%, and boron in amounts of from about 0.75% to about 5.25%, with the balance or remainder substantially all nickel, it being understood, however, that wherever the expression "remainder substantially all nickel" is used in the present specification and claims, said expression is to be construed as including, whenever present in the alloy, small amounts of iron, manganese and chromium, in a total amount of less than 5%. A preferred alloy, within the above ranges, contains from 4.5% to 5.2% silicon, and from 2 to 3.5% boron.

Alloys made in accordance with the invention have unusual adherence properties, particularly the ability to adhere to stainless steel and to pure molybdenum. In the brazing or joining of stainless steel strips and plates, the alloy, in powder form, the particles of which are bonded or held together by means of a binder, is placed between the strips or plates to be brazed or joined, and the composite part or product is then fabricated either in a brazing furnace at temperatures of from about 1750° F. to about 2100° F., or by means of a heating torch, in a conventional manner. As the part or product is heated, the alloy melts, flows and firmly bonds or joins the sheets or strips to each other.

The alloys are especially well adapted for hard facing at relatively low temperatures, such as those indicated above, and are resistant to wear, impact, corrosion and oxidation, being resistant to oxidation at temperatures even up to their melting points.

The melting points of the alloys are so low, i. e., between 1750° F. and 2100° F. in air, that they may be applied as facings to poppet valves and the like, with considerably more ease than is possible when facing such articles with conventionally-employed hard facing metals.

They may be readily bonded with almost any variety of base metal, satisfactory bonds being obtained at temperatures far below those required when using conventional hard facing metals.

In those cases where the silicon content of the alloy exceeds 2.5%, the alloys have the unusual property of being formable over a temperature range which may be as great as 150° to 350° F. In this formable state, or condition, the metal is coherent, but can be shaped, smoothed or molded by the application of a small amount of pressure, that is, of not more than a few pounds per square inch.

The hardness of the alloy is readily controlled between 20 and 65 Rockwell C by adjusting the silicon and boron contents of the alloy. In the following table the relationship of silicon and boron to hardness is indicated, as well as the formability of the alloy, resistance thereof to lead oxide at 1500°–1600° F. and adherence to base metals.

| B | Si | Rockwell C | Formability | Resistance to PbO at 1,500–1,600° F. | Adherence to Steels, Stainless Steels and Pure Molybdenum |
|---|---|---|---|---|---|
| 2.2 | 0 | 20–25 | No | Good | Unsatisfactory. |
| 2.8 | 0 | 35–40 | No | do | Do. |
| 3.3 | 0 | 40–50 | No | Fair | Do. |
| 5.0 | 0 | 50–55 | No | do | Do. |
| 2.2 | 1.7 | 30–35 | No | do | Do. |
| 2.2 | 2.5 | 40–45 | Some | Good | Fair. |
| 2.2 | 3.4 | 44–49 | Definite | Excellent | Good. |
| 2.2 | 5.0 | 50–55 | Strong | Good | Do. |
| 2.8 | 2.5 | 40–45 | Some | do | Fair. |
| 3.3 | 2.5 | 53–58 | do | do | Do. |
| 2.2 | 5 | 50–55 | Strong | do | Good. |
| 2.5 | 5 | 52–57 | do | do | Do. |
| 2.75 | 5 | 55–60 | do | do | Do. |
| 3.3 | 5 | 57–62 | do | do | Do. |
| 3.75 | 8 | 60–65 | do | Fair | Unsatisfactory. |

In order to avoid brittleness of the alloy, when silicon is present in amounts of 5% or more, the amount of boron must be less than 4%, and preferably less than 3.5%. The lower useful limit for boron is 0.75%, but normally, the boron content is in excess of 1%.

The alloys most useful for application to poppet valves are those whose hardnesses lie between 35 and 55 Rockwell C. The boron content for such alloys lies between 2% and 5%, and the silicon may be as high as 5% for boron contents up to 2.65%, but above that boron value, the silicon is decreased, so that with 3.3% boron, the silicon content is 2.5% or less; about 4% boron, the silicon decreased to less than 1%.

Since formability after welding is an important factor, the silicon content must be 2.5% or greater, and the boron content is adjusted accordingly to maintain the required hardness.

Due to the unusual resistance of the alloy to oxidation, it finds an important use or application in the coating of pure molybdenum, thereby making it especially valuable in the manufacture of parts for jet engines. In an atmosphere of helium, it is possible to similarly coat titanium. As is well known, both molybdenum and titanium, particularly the former, are extremely susceptible to oxidation, so that the present alloy, when used as a coating for these metals, protects them from attack.

A number of tests have been made, including the bending of molybdenum coated with the present alloy at an angle of 90 degrees. The alloy, although it cracks to some extent, remains firmly adhered to the molybdenum.

The alloy may be made by melting nickel, a nearly pure silicon and a nickel-boron alloy which normally contains about 17% boron. It can also be made by adding amorphous boron to a melt containing the nickel and silicon.

It is to be understood that various changes may be made in the proportions of the ingredients of the alloy, without departing from the spirit of the invention or the scope of the appended claims.

Having thus described my invention, I claim:

1. An alloy which is especially adapted for hard facing at relatively low temperatures, which alloy has unusual adherence properties and particularly the ability to adhere to stainless steel and to pure molybdenum, and is extremely resistant to oxidation at temperatures up to its melting point, said alloy being plastically formable over a temperature range of from 150 to 350 Fahrenheit degrees, said alloy consisting of silicon in amounts of from about 2.5% to about 5.5%, boron in an amount of from about 0.75% to about 5.25%, and the balance of the alloy being essentially nickel.

2. An alloy, as defined in claim 1, in which when the amount of silicon is 5% to 5.5%, the boron is less than 4%.

3. An alloy as defined in claim 1 in which boron is present in the amount of 2.65% to 5.25% and silicon does not exceed 5.0%.

4. An alloy as defined in claim 1 in which silicon is present in an amount of 4.5% to 5.2% and boron is present in an amount from 2.0% to 3.5%.

5. An alloy as defined in claim 1 including up to 5.0% of iron, manganese and chromium, combined.

References Cited in the file of this patent

UNITED STATES PATENTS 2,165,793    Grossman              July 11, 1939

FOREIGN PATENTS 580,686    Great Britain           Sept. 17, 1946

OTHER REFERENCES

Welding Journal, vol. 29, Dec. 1950, pages 1053–1058, particular page 1054.